(12) United States Patent
Liu et al.

(10) Patent No.: US 11,235,821 B2
(45) Date of Patent: Feb. 1, 2022

(54) RECONFIGURABLE JOINT TRACK COMPOUND MOBILE ROBOT

(71) Applicant: SHENYANG INSTITUTE OF AUTOMATION, CHINESE ACADEMY OF SCIENCES, Liaoning (CN)

(72) Inventors: Jinguo Liu, Liaoning (CN); Xing Li, Liaoning (CN); Jian Ding, Liaoning (CN); Yuwang Liu, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 16/976,922

(22) PCT Filed: Dec. 31, 2018

(86) PCT No.: PCT/CN2018/125990
§ 371 (c)(1),
(2) Date: Aug. 31, 2020

(87) PCT Pub. No.: WO2020/133546
PCT Pub. Date: Jul. 2, 2020

(65) Prior Publication Data
US 2021/0039726 A1 Feb. 11, 2021

(30) Foreign Application Priority Data

Dec. 29, 2018 (CN) .......................... 201811633906.1

(51) Int. Cl.
*B62D 55/075* (2006.01)
*B62D 55/065* (2006.01)
(Continued)

(52) U.S. Cl.
CPC ......... *B62D 55/075* (2013.01); *B62D 55/065* (2013.01); *B62D 55/08* (2013.01); *B62D 55/125* (2013.01)

(58) Field of Classification Search
CPC ............... B62D 55/075; B62D 55/065; B62D 55/0655; B62D 55/125
(Continued)

(56) References Cited

U.S. PATENT DOCUMENTS 3,730,287 A * 5/1973 Fletcher ............... B60K 17/043
180/6.5
4,702,331 A * 10/1987 Hagihara ................... B25J 5/00
180/8.7
(Continued)

FOREIGN PATENT DOCUMENTS

CN 102627127 A 8/2012
CN 104443085 A 3/2015
(Continued)

*Primary Examiner* — Anne Marie M Boehler
(74) *Attorney, Agent, or Firm* — Novick, Kim & Lee, PLLC; Allen Xue

(57) ABSTRACT

A reconfigurable joint track compound mobile robot has a main vehicle body, yaw joints and an auxiliary track module. The main vehicle body has a main track, and a clutch brake and a first wheel joint arranged in a main track driving wheel. A second wheel joint is arranged in a main track driven wheel. The main vehicle body is provided with main track driving mechanisms and a wheel joint driving mechanism. The main track driving wheel is driven to rotate by the main track driving mechanisms, which are connected with the clutch brake. The second wheel joint is driven to rotate by the wheel joint driving mechanism. Each wheel joint is correspondingly connected with the yaw joints, which are rotatably connected with the auxiliary track module. A yaw
(Continued)

driving mechanism that drives the auxiliary track module to swing is arranged in each yaw joint.

10 Claims, 7 Drawing Sheets

(51) Int. Cl.
*B62D 55/125* (2006.01)
*B62D 55/08* (2006.01)

(58) Field of Classification Search
USPC .................................... 180/9.32, 9.4; 901/1
See application file for complete search history.

(56) References Cited

U.S. PATENT DOCUMENTS

| | | | | |
|---|---|---|---|---|
| 4,977,971 | A * | 12/1990 | Crane, III | ................. B25J 5/00 |
| | | | | 180/8.3 |
| 10,967,690 | B2 * | 4/2021 | Zona | ..................... B60F 3/0015 |
| 2014/0070502 | A1 * | 3/2014 | Ferguson | ........... B62D 55/0655 |
| | | | | 280/5.28 |
| 2014/0166377 | A1 * | 6/2014 | Terrien | ................. B62D 55/065 |
| | | | | 180/9.32 |
| 2015/0210327 | A1 * | 7/2015 | Wolf | ...................... B62D 55/24 |
| | | | | 180/9.28 |
| 2017/0344027 | A1 | 11/2017 | Dahm et al. | |

FOREIGN PATENT DOCUMENTS

| | | | | |
|---|---|---|---|---|
| CN | 105480313 | A | 4/2016 | |
| CN | 206552137 | * | 10/2017 | ............. B82D 55/04 |
| CN | 107776692 | A | 3/2018 | |
| CN | 107953937 | A | 4/2018 | |
| CN | 211893441 | * | 11/2020 | ........... B62D 55/065 |
| CN | 112091929 | * | 12/2020 | ........... B62D 55/065 |
| EP | 2479088 | A1 * | 7/2012 | ......... B62D 55/0655 |
| JP | 2012061963 | A | 3/2012 | |

* cited by examiner

RECONFIGURABLE JOINT TRACK COMPOUND MOBILE ROBOT

TECHNICAL FIELD

The present invention relates to the field of mobile robots, and particularly relates to a reconfigurable joint track compound mobile robot.

BACKGROUND

A mobile robot often needs to quickly enter a complex terrain and work in the complex terrain, e.g., surveying the terrain and transmitting environmental information of a surveying site. The motion terrains of the mobile robot are very complex, including artificially built terrains such as steps, stairs and trenches, messy terrains formed after disasters, and terrains with narrow environmental spaces. This requires a mobile chassis of the mobile robot to have the capability to overcome the above complex terrains. However, the mobile robot used for detection work in the prior art has a single form of walking mechanism, poor terrain adaptability and low flexibility, and is difficult to satisfy the motion requirements for the complex terrains such as narrow passages, ravines and steps.

SUMMARY

The purpose of the present invention is to provide a reconfigurable joint track compound mobile robot which realizes structural reconfiguration by changing the angles of different yaw joints and auxiliary track modules, can realize complicated and changeable walking forms, and is suitable for various complicated terrain environments such as narrow passages, wide ravines, step terrain movement, step climbing and rough road movement.

The purpose of the present invention is realized by the following technical solution:

A reconfigurable joint track compound mobile robot comprises a main vehicle body, yaw joints and an auxiliary track module. The main vehicle body is provided with a main track, and a clutch brake and a first wheel joint fixedly connected together are arranged in a main track driving wheel. A second wheel joint is arranged in a main track driven wheel. The main vehicle body is provided with main track driving mechanisms and a wheel joint driving mechanism, wherein the main track driving wheel is driven to rotate by the main track driving mechanisms and the main track driving mechanisms are connected with the clutch brake. The second wheel joint is driven to rotate by the wheel joint driving mechanism. The first wheel joint and the second wheel joint are respectively connected with corresponding yaw joints. An adapter seat is arranged at one end of the yaw joint away from the main vehicle body. An auxiliary track is arranged on the auxiliary track module, and the axle end of an auxiliary track first wheel axle is rotatably connected with the adapter seat on the corresponding yaw joint; a yaw driving mechanism is arranged in the yaw joint, and the auxiliary track module is driven to swing through the yaw driving mechanism in the corresponding yaw joint. An auxiliary track driving mechanism and a rotary driving mechanism are arranged in the auxiliary track module, and the auxiliary track is driven to rotate by the auxiliary track driving mechanism. The entire auxiliary track module is driven to rotate around the auxiliary track first wheel axle by the rotary driving mechanism.

A main track first wheel axle and a main track second wheel axle are arranged in the main vehicle body, and both ends of the main track first wheel axle are provided with main track driving wheels. Both ends of the main track second wheel axle are provided with main track driven wheels. The main track driving wheel and the main track driven wheel which are positioned on the same side are connected through the main track. Two main track driving mechanisms and two wheel joint driving mechanisms are arranged in the main vehicle body. Each main track driving wheel is driven to rotate by the corresponding main track driving mechanism; and the second wheel joint in each main track driven wheel is driven to rotate by the corresponding wheel joint driving mechanism.

Each main track driving mechanism comprises a main track driving device, a main track driving gear and a main track driven gear. The main track driving device is fixedly arranged in the main vehicle body. The main track driving gear is installed on an output shaft of the main track driving device. The main track driven gear is fixedly arranged in the corresponding main track driving wheel and connected with the clutch brake in the main track driving wheel. The main track driving gear is engaged with the main track driven gear.

Each wheel joint driving mechanism comprises a wheel joint driving device, a wheel joint driving gear and a wheel joint driven gear. The wheel joint driving device is fixedly arranged in the main vehicle body. The wheel joint driving gear is installed on an output shaft of the wheel joint driving device. The wheel joint driven gear is rotatably arranged in the corresponding main track driven wheel and fixedly connected with the second wheel joint in the main track driven wheel; and the wheel joint driving gear is engaged with the wheel joint driven gear.

Each yaw joint is provided with a joint shell. The yaw driving mechanism is arranged in the yaw joint shell. The yaw driving mechanism comprises a yaw driving device, a yaw driving gear and a yaw driven bevel gear. The yaw driving device is fixedly arranged in the yaw joint shell. The yaw driving gear is installed on the output shaft of the yaw driving device and engaged with the yaw driven bevel gear; and the yaw driven bevel gear is fixedly connected with the axle end of the corresponding auxiliary track first wheel axle.

One end of the yaw joint shell is provided with a yaw connecting piece, and the other end is provided with the adapter seat. The yaw driving gear and the yaw driven bevel gear are arranged in the adapter seat.

The auxiliary track module comprises an auxiliary track first wheel axle, an auxiliary track second wheel axle, an auxiliary track frame and an auxiliary track. The auxiliary track first wheel axle and the auxiliary track second wheel axle are respectively arranged on both ends of the auxiliary track frame and the auxiliary track first wheel axle is provided with an auxiliary track driven wheel. The auxiliary track second wheel axle is provided with an auxiliary track driving wheel. The auxiliary track driving wheel and the auxiliary track driven wheel are connected through the auxiliary track; and the auxiliary track frame is provided with the auxiliary track driving mechanism and the rotary driving mechanism.

The auxiliary track driving mechanism comprises an auxiliary track driving device, an auxiliary track driving gear and an auxiliary track driven gear. The auxiliary track driving device is fixedly arranged in the auxiliary track frame. The auxiliary track driving gear is installed on an output shaft of the auxiliary track driving device and engaged with the auxiliary track driven gear. The auxiliary track driven gear is fixedly connected with the auxiliary track second wheel axle.

The rotary driving mechanism comprises an auxiliary track module rotary driving device, a rotary driving gear, a rotary driven gear, a worm and a worm gear. The auxiliary track module rotary driving device is fixedly arranged in the auxiliary track frame. The rotary driven gear and the worm are coaxial and are rotatably arranged in the auxiliary track frame. The rotary driving gear is installed on an output shaft of the auxiliary track module rotary driving device. The rotary driving gear is engaged with the rotary driven gear; and the worm gear is fixedly arranged on the auxiliary track first wheel axle and the worm gear is engaged with the worm.

The main vehicle body is provided with a sensor module.

The present invention has the advantages and positive effects that:

1. The present invention realizes structural reconfiguration by changing the angles of different yaw joints and auxiliary track modules, can realize complicated and changeable walking forms, is suitable for various complicated terrain environments such as narrow passages, wide ravines, step terrain movement, step climbing and rough road movement, and can better satisfy the passing needs of disaster terrains and complex terrains and the needs of environmental information detection and site scenario information collection for disaster sites and complex terrain sites.

2. The present invention drives the corresponding yaw joints to swing through the clutch brake in the main track driving wheel. When the clutch brake is not braked, the main track and the auxiliary track realize the joint walking mode, which is flexible to use.

Wherein 1 main vehicle body; 101 main track; 102 controller; 103 main track second wheel axle; 104 wheel joint driving device; 105 main track driven wheel; 1051 wheel joint driven gear; 1052 second wheel joint; 1053 second wheel joint bearing; 106 wheel joint driving gear; 107 main track driving gear; 108 main track driving wheel; 1081 main track driven gear; 1082 clutch brake; 1083 first wheel joint; 1084 first wheel joint bearing; 109 main track driving device; 110 conductive slip ring; 111 main frame; 112 main vehicle body cover plate; 113 main track first wheel axle; 2 yaw joint; 201 yaw driven bevel gear; 202 yaw joint shell; 203 yaw connecting piece; 204 yaw driving device; 205 yaw bearing; 206 yaw driving gear; 207 adapter seat; 3 auxiliary track module; 301 auxiliary track first wheel axle; 3011 axle end; 302 auxiliary track frame; 303 auxiliary track driving device; 304 auxiliary track; 305 auxiliary track driving gear; 306 auxiliary track driven gear; 307 auxiliary track second wheel axle; 308 auxiliary track driving wheel; 309 auxiliary track module rotary driving device; 310 worm gear; 311 auxiliary track driven wheel; 312 rotary driving gear; 313 rotary driven gear; 314 worm; 315 auxiliary track bearing; 4 sensor module; 401 visual sensor; 402 installing bracket; and 403 environmental information detecting and sensing device.

DETAILED DESCRIPTION

The present invention is further detailed below in combination with the drawings.

Figure 1:
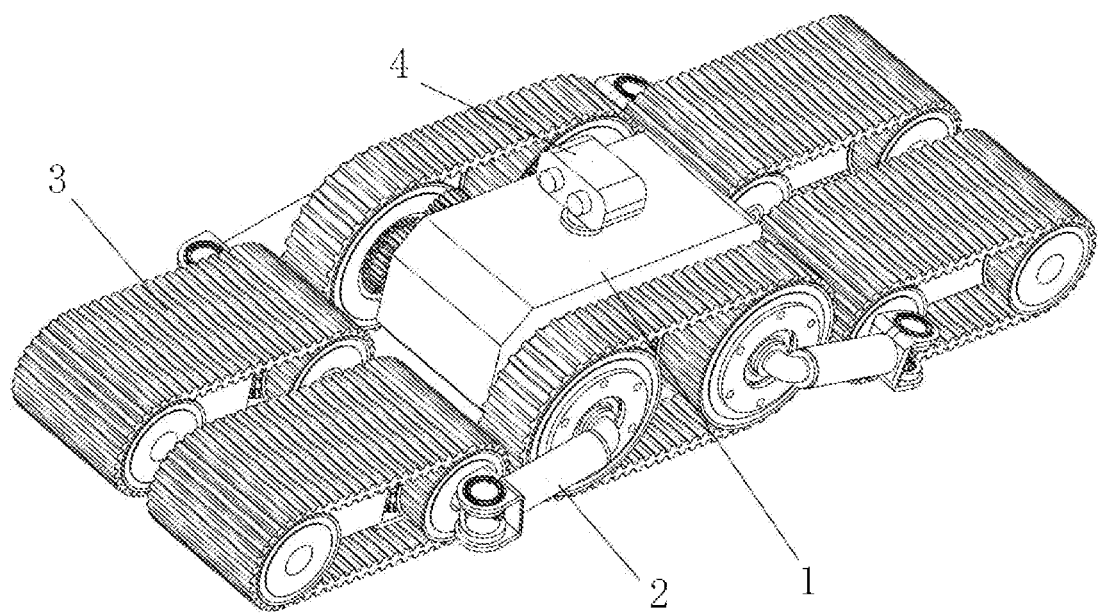
FIG. 1 is a stereographic schematic diagram of the present invention.
Figure 2:
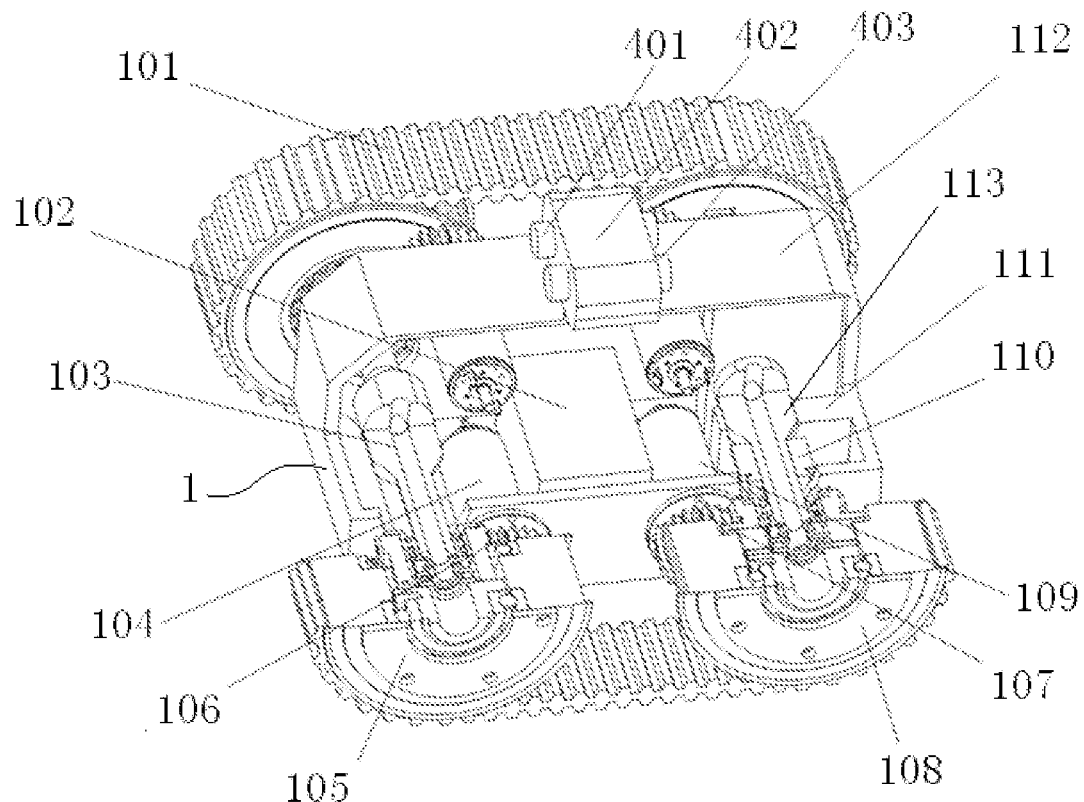
FIG. 2 is a structural schematic diagram of a main vehicle body in FIG. 1.
Figure 3:
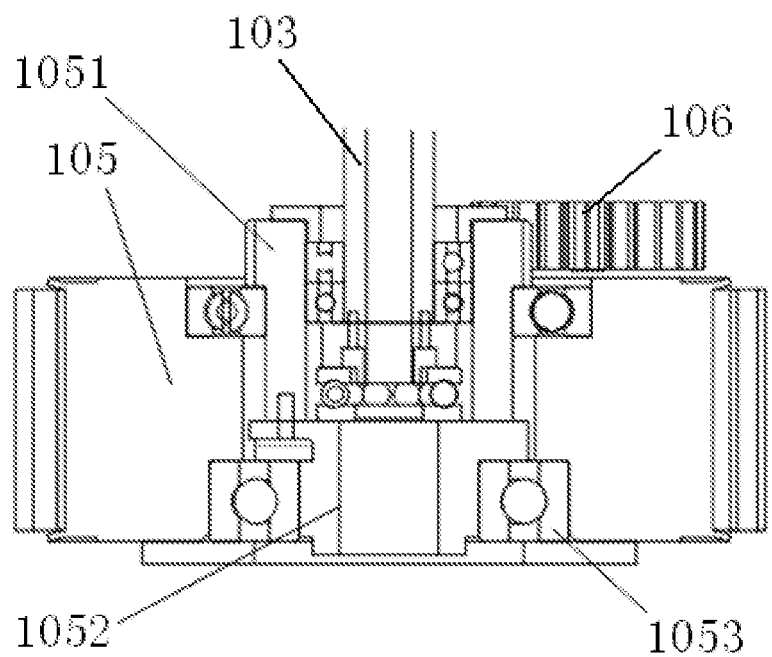
FIG. 3 is a structural schematic diagram of a driven wheel in FIG. 2.
Figure 4:
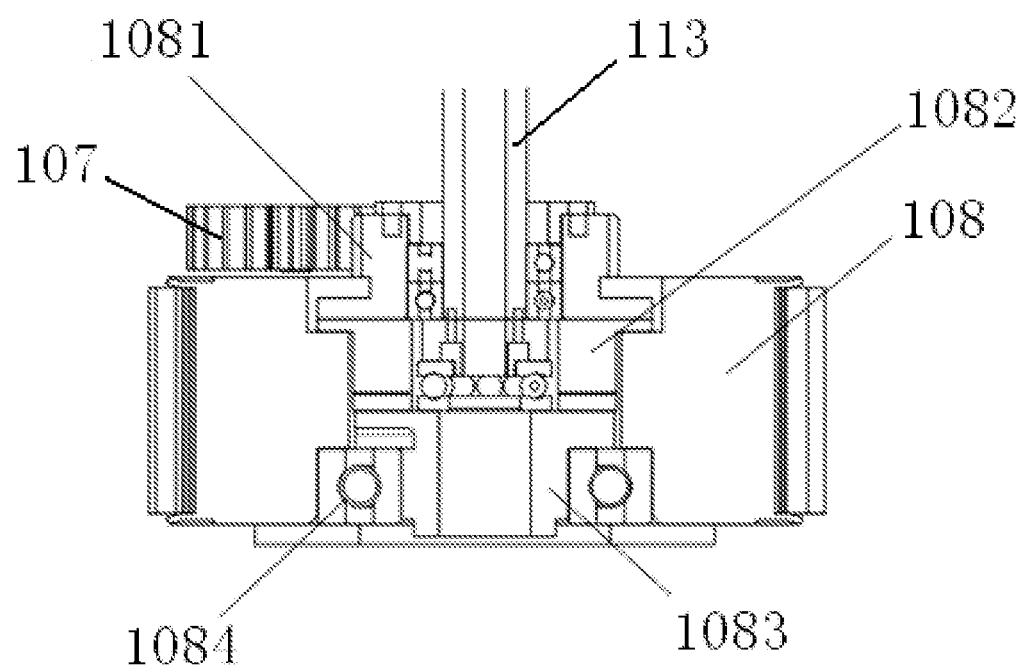
FIG. 4 is a structural schematic diagram of a driving wheel in FIG. 2.
Figure 5:
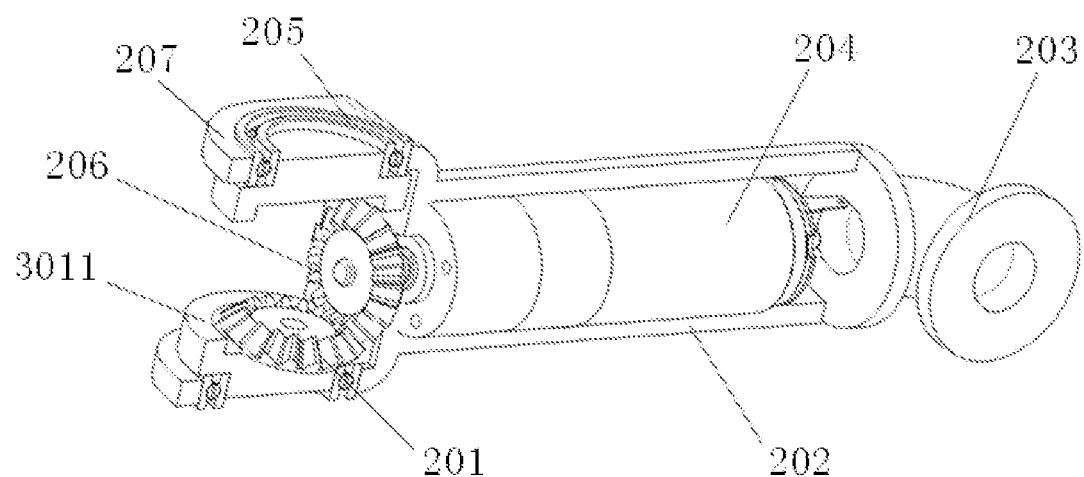
FIG. 5 is a structural schematic diagram of a yaw joint in FIG. 1.
Figure 6:
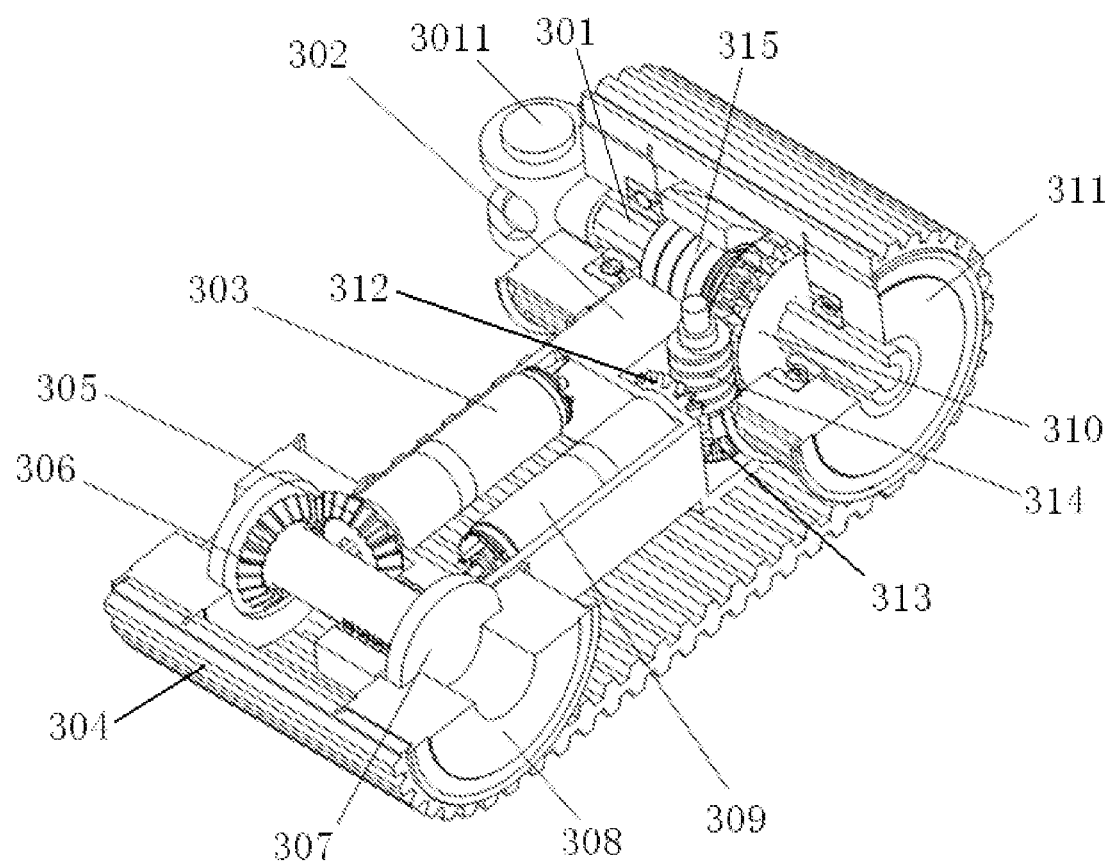
FIG. 6 is a structural schematic diagram of an auxiliary track module in FIG. 1.
Figure 7:
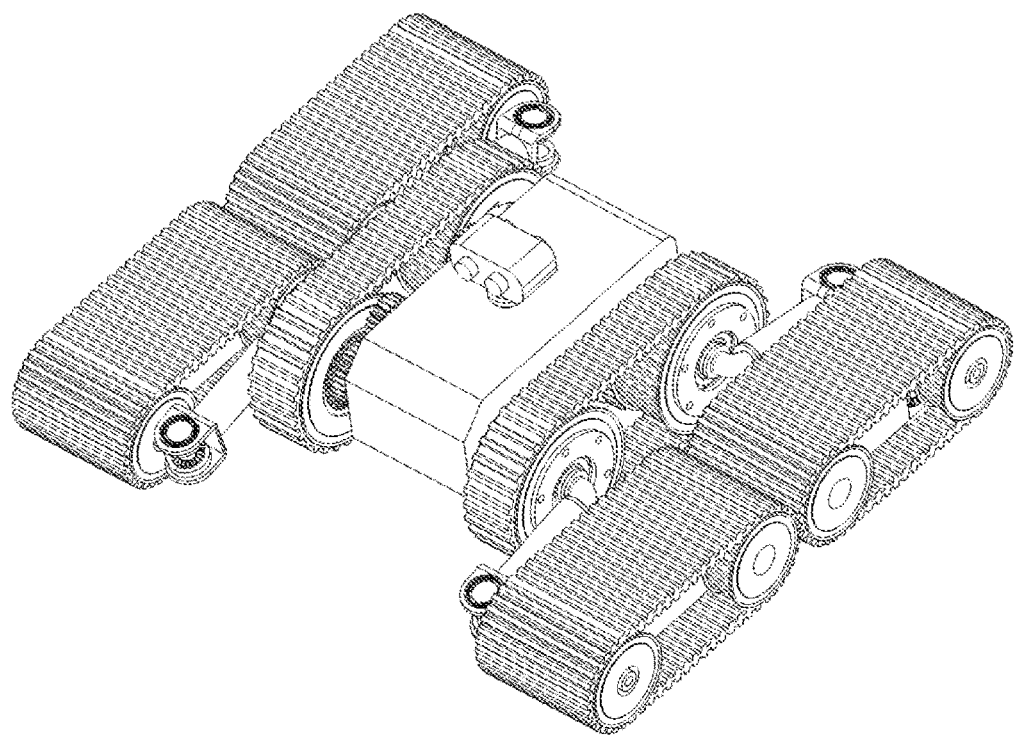
FIG. 7 is a schematic diagram of another walking form of the present invention.
Figure 8:
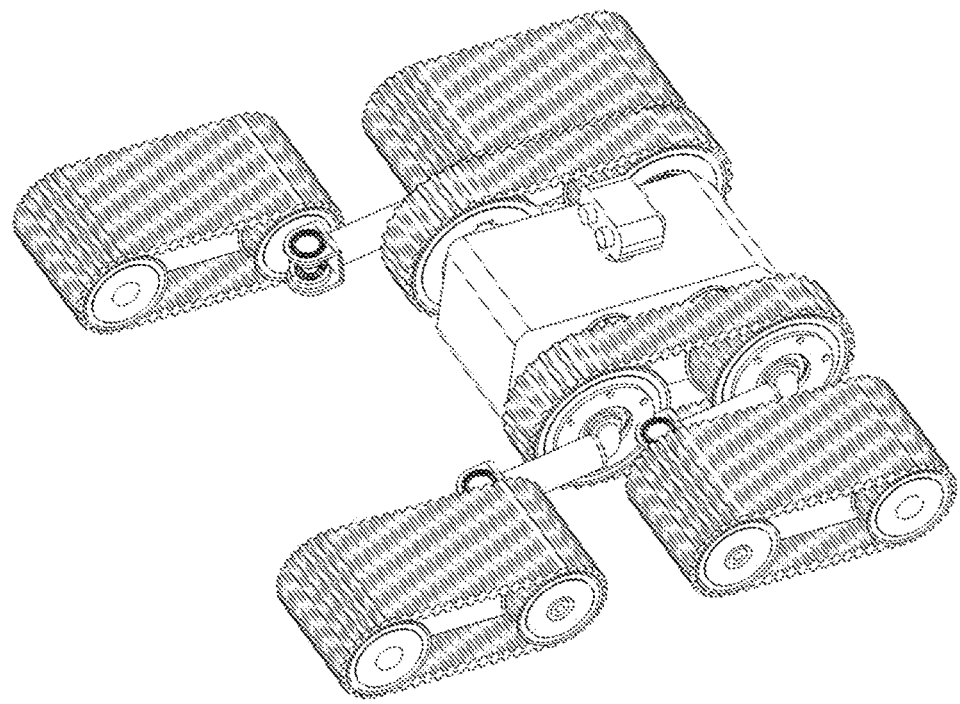
FIG. 8 is a schematic diagram of yet another walking form of the present invention.
Figure 9:
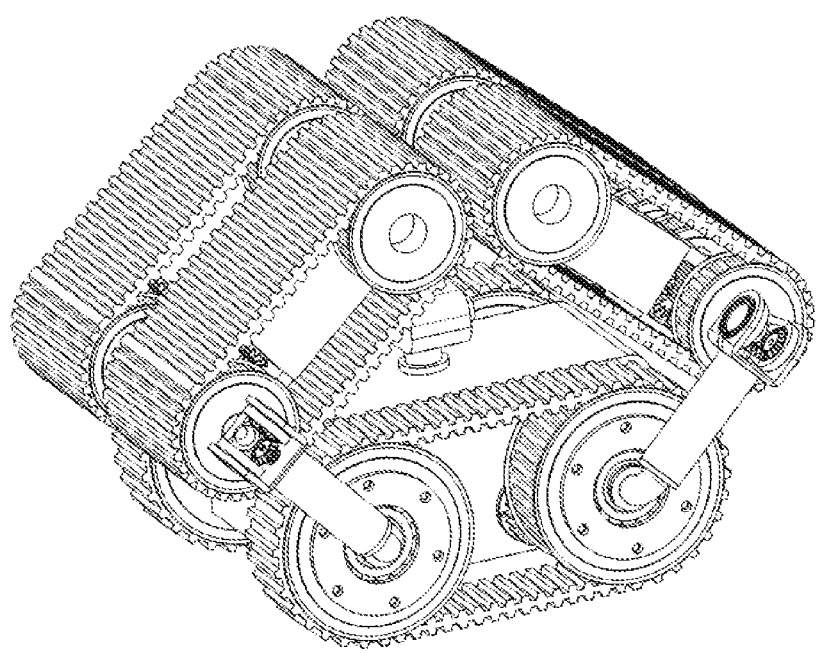
FIG. 9 is a schematic diagram of still another walking form of the present invention.
Figure 10:
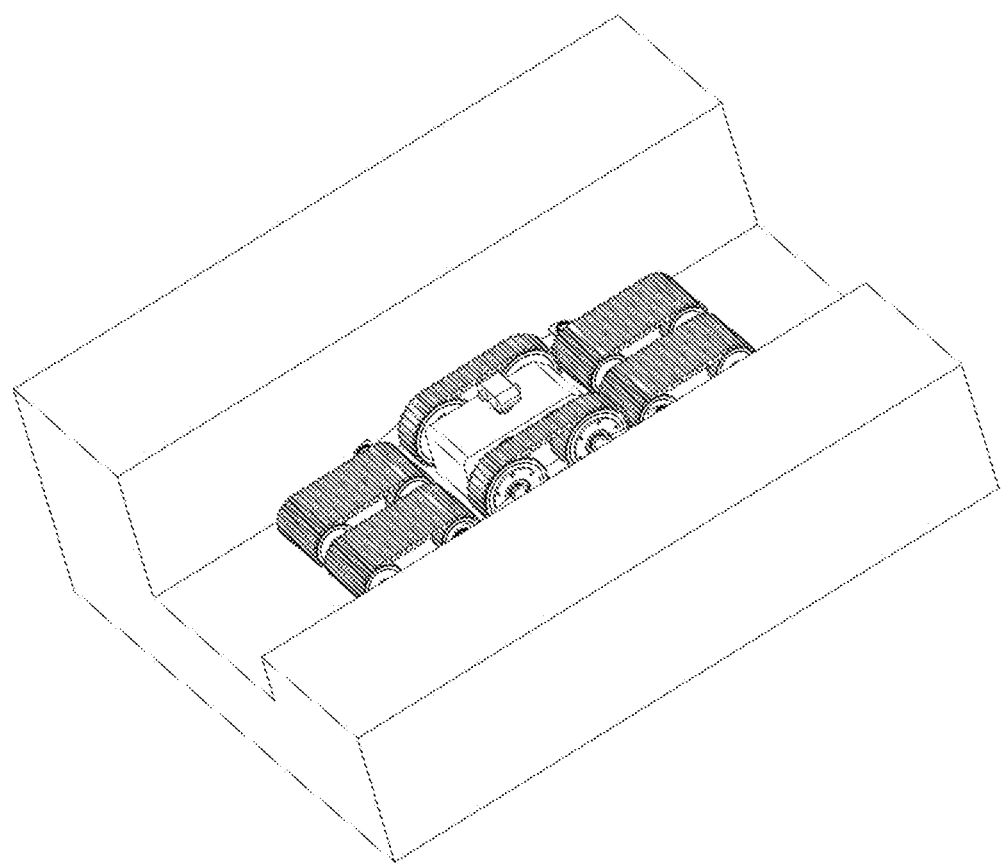
FIG. 10 is a schematic diagram when the present invention passes through a narrow passage.
Figure 11:
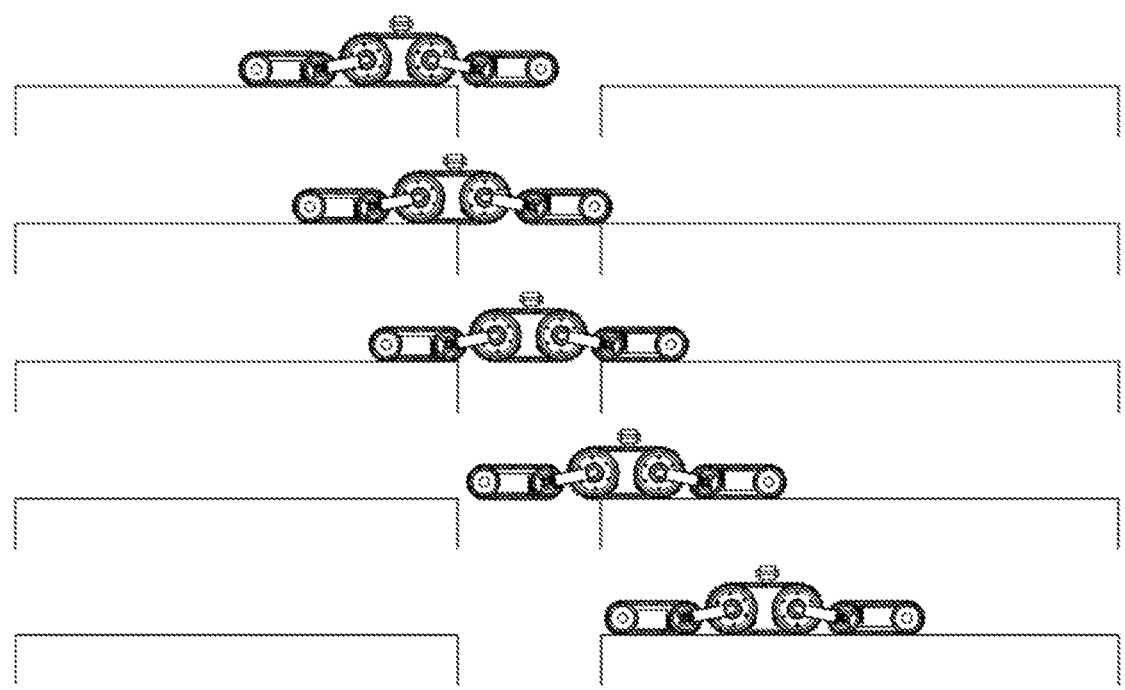
FIG. 11 is a schematic diagram when the present invention passes through a wide ravine.
Figure 12:
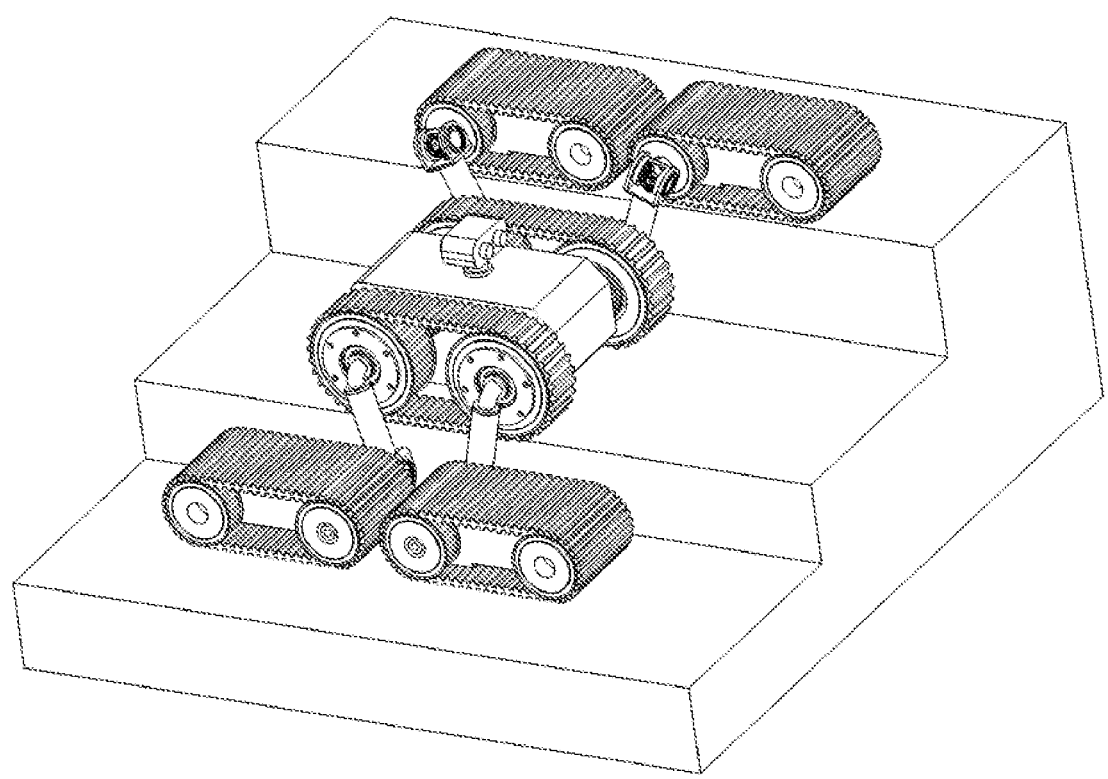
FIG. 12 is a schematic diagram when the present invention passes through a step terrain.
Figure 13:
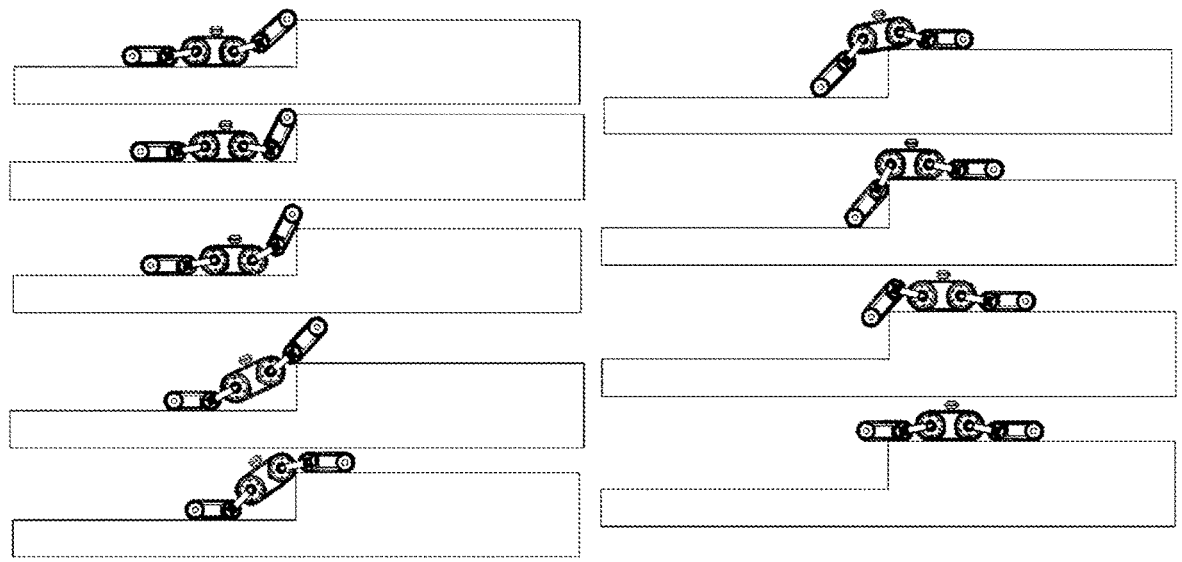
FIG. 13 is a schematic diagram when the present invention climbs steps.
Figure 14:
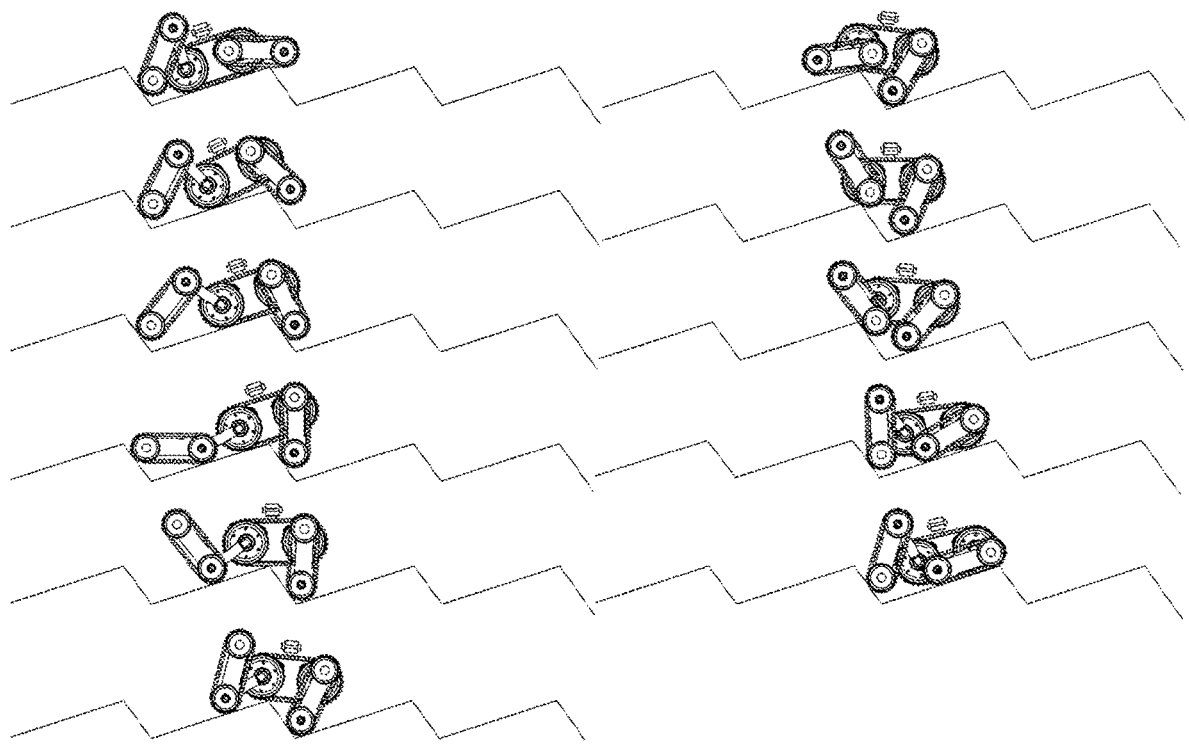
FIG. 14 is a schematic diagram when the present invention moves on a rough road.

As shown in FIGS. 1-6, the present invention comprises a main vehicle body 1, yaw joints 2 and auxiliary track modules 3. As shown in FIGS. 2-4, main tracks 101 are arranged on both sides of the main vehicle body 1, and a clutch brake 1082 and a first wheel joint 1083 fixedly connected together are arranged in a main track driving wheel 108. A second wheel joint 1052 is arranged in a main track driven wheel 105. The main vehicle body 1 is provided with main track driving mechanisms and a wheel joint driving mechanism, wherein the main track driving wheel 108 is driven to rotate by the main track driving mechanisms and drives the main tracks 101 to move. The main track driving mechanisms are connected with the clutch brake 1082. When the clutch brake 1082 is braked, the clutch brake 1082 and the first wheel joint 1083 rotate together with the main track driving wheel 108. When the clutch brake 1082 is not braked, the main track driving mechanisms only drive the main track driving wheel 108 to rotate and the first wheel joint 1083 does not rotate. At this moment, the main tracks 101 and the auxiliary track modules 3 jointly realize the walking mode. The second wheel joint 1052 is driven to rotate by the wheel joint driving mechanism. The first wheel joint 1083 and the second wheel joint 1052 are respectively connected with corresponding yaw joints 2, and each yaw joint 2 is rotatably connected with one auxiliary track module 3. As shown in FIGS. 5-6, an adapter seat 207 is arranged at one end of the yaw joint 2 away from the main vehicle body 1. An auxiliary track 304 is arranged on the auxiliary track module 3, and the axle end 3011 of an auxiliary track first wheel axle 301 is rotatably connected with the adapter seat 207 on the corresponding yaw joint 2. A yaw driving mechanism is arranged in the yaw joint 2, and the auxiliary track module 3 is driven to swing through the yaw driving mechanism in the corresponding yaw joint 2. An auxiliary track driving mechanism and a rotary driving mechanism are arranged in the auxiliary track module 3, and the auxiliary track 304 on the auxiliary track module 3 is driven to rotate by the auxiliary track driving mechanism; and the entire auxiliary track module 3 is driven to rotate around the auxiliary track first wheel axle 301 by the rotary driving mechanism.

As shown in FIG. 2, a main track first wheel axle 113 and a main track second wheel axle 103 are arranged in the main vehicle body 1, and both ends of the main track first wheel axle 113 are provided with main track driving wheels 108. Both ends of the main track second wheel axle 103 are provided with main track driven wheels 105. The main track driving wheel 108 and the main track driven wheel 105 which are positioned on the same side are connected through the main track 101. Two main track driving mechanisms and two wheel joint driving mechanisms are arranged in the main vehicle body 1. Each main track driving wheel 108 is driven to rotate by the corresponding main track driving mechanism; and the second wheel joint 1052 in each main track driven wheel 105 is driven to rotate by the corresponding wheel joint driving mechanism. As shown in FIG. 2, the main track first wheel axle 113 and the main track second wheel axle 103 are hollow for wiring.

As shown in FIG. 2 and FIG. 4, each main track driving mechanism comprises a main track driving device 109, a main track driving gear 107 and a main track driven gear 1081. The main track driving device 109 is fixedly arranged in the main vehicle body 1. The main track driving gear 107 is installed on an output shaft of the main track driving device 109. The main track driven gear 1081 is fixedly arranged in the main track driving wheel 108 and connected with the clutch brake 1082; and the main track driving gear 107 is engaged with the main track driven gear 1081. When the device is operated, the main track driving device 109 transmits a torque to drive the main track driving wheel 108 to rotate by the main track driving gear 107 and the main track driven gear 1081, so as to drive the main track 101 to move. When the clutch brake 1082 is braked, the clutch brake 1082 is connected with the main track driven gear 1081 and the first wheel joint 1083 rotates together with the main track driving wheel 108. The clutch brake 1082 is a known technology in the art, and is a commercially available product. In addition, in the present embodiment, the main track driving device 109 comprises a motor and a decelerator which are connected together.

As shown in FIG. 2, the main track first wheel axle 113 is provided with a conductive slip ring 110. The conductive slip ring 110 comprises an inner ring stator and an outer ring rotor. The stator is fixedly sleeved on the main track first wheel axle 113. A cable of the clutch brake 1082 is connected with the outer ring rotor of the conductive slip ring 110. When the main track driving wheel 108 rotates, the cable of the clutch brake 1082 also rotates with the main track driving wheel 108. The rotor of the conductive slip ring 110 synchronously rotates with the other ed of the cable of the clutch brake 1082 to prevent the cable of the clutch brake 1082 from being twisted. The conductive slip ring 110 is a known technology in the art.

As shown in FIG. 2 and FIG. 3, each wheel joint driving mechanism comprises a wheel joint driving device 104, a wheel joint driving gear 106 and a wheel joint driven gear 1051. The wheel joint driving device 104 is fixedly arranged in the main vehicle body 1. The wheel joint driving gear 106 is installed on an output shaft of the wheel joint driving device 104. The wheel joint driven gear 1051 is supported by a bearing and rotatably arranged in the main track driven wheel 105. The wheel joint driven gear 1051 is fixedly connected with the second wheel joint 1052 and is engaged with the wheel joint driving gear 106. When the device is operated, the wheel joint driving device 104 transmits the torque to drive the second wheel joint 1052 to rotate by the wheel joint driving gear 106 and the wheel joint driven gear 1051. In the present embodiment, the wheel joint driving device 104 comprises a motor and a decelerator which are connected together.

As shown in FIG. 3 and FIG. 4, the first wheel joint 1083 is supported and installed on the main track driving wheel 108 by a first wheel joint bearing 1084. The second wheel joint 1052 is supported and installed on the main track driven wheel 105 by a second wheel joint bearing 1053; and the yaw joint 2 does not influence the rotation and walk of the main track 101 when swinging.

As shown in FIG. 2, the main vehicle body 1 comprises a main frame 111 which carries various driving mechanisms and a controller 102. The upper side of the main frame 111 is provided with a main vehicle body cover plate 112. The clutch brake 1082 is controlled by the controller 102.

As shown in FIG. 5, the yaw joint 2 comprises a yaw joint shell 202, a yaw connecting piece 203, an adapter seat 207 and a yaw driving mechanism; and one end of the yaw joint shell 202 is provided with the yaw connecting piece 203 connected with the corresponding first wheel joint 1083 or second wheel joint 1052. In the present embodiment, the yaw connecting piece 203 is a bent pipe with 90° corner, and the interior is used for wiring. The other end of the yaw joint shell 202 is provided with the adapter seat 207 rotatably connected with the corresponding auxiliary track module 3. The yaw driving mechanism is arranged in the yaw joint shell 202.

As shown in FIG. 5, the yaw driving mechanism comprises a yaw driving device 204, a yaw driving gear 206 and a yaw driven bevel gear 201. The yaw driving device 204 is fixedly arranged in the yaw joint shell 202. The yaw driving gear 206 is installed on the output shaft of the yaw driving device 204. The axle end 3011 of the auxiliary track first wheel axle 301 is supported by a yaw bearing 205 and rotatably connected with the adapter seat 207 of the yaw joint 2. The yaw driving gear 206 is engaged with the yaw driven bevel gear 201, and the yaw driven bevel gear 201 is fixedly connected with the axle end 3011 of the auxiliary track first wheel axle 301. The yaw driving gear 206 and the yaw driven bevel gear 201 are arranged in the adapter seat 207. When the device is operated, the yaw driving device 204 transmits the torque through the yaw driving gear 206 and the yaw driven bevel gear 201, so as to drive the auxiliary track module 3 to axially rotate around the axle end 3011. In the present embodiment, the yaw driving device 204 comprises a motor, a primary decelerator and a secondary decelerator which are connected in sequence.

As shown in FIG. 6, the auxiliary track module 3 comprises an auxiliary track first wheel axle 301, an auxiliary track second wheel axle 307, an auxiliary track frame 302 and an auxiliary track 304. The auxiliary track first wheel axle 301 and the auxiliary track second wheel axle 307 are respectively arranged on both ends of the auxiliary track frame 302 and the auxiliary track first wheel axle 301 is provided with an auxiliary track driven wheel 311. The auxiliary track second wheel axle 307 is provided with an auxiliary track driving wheel 308. The auxiliary track driving wheel 308 and the auxiliary track driven wheel 311 are connected through the auxiliary track 304. The auxiliary track frame 302 is provided with the auxiliary track driving mechanism and the rotary driving mechanism. The auxiliary track first wheel axle 301 is hollow for wiring.

As shown in FIG. 6, the auxiliary track driving mechanism comprises an auxiliary track driving device 303, an auxiliary track driving gear 305 and an auxiliary track driven gear 306. The auxiliary track driving device 303 is fixedly arranged in the auxiliary track frame 302. The auxiliary track driven gear 306 is fixedly connected with the auxiliary track second wheel axle 307. The auxiliary track driving gear 305 is installed on an output shaft of the auxiliary track driving device 303 and engaged with the auxiliary track driven gear 306. When the device is operated, the auxiliary track driving device 303 transmits the torque to drive the auxiliary track second wheel axle 307 to rotate by the auxiliary track driving gear 305 and the auxiliary track driven gear 306, so as to drive the auxiliary track 304 to move by the auxiliary track driving wheel 308. In the present embodiment, the auxiliary track driving device 303 comprises a motor and a decelerator which are connected.

As shown in FIG. 6, the rotary driving mechanism comprises an auxiliary track module rotary driving device 309, a rotary driving gear 312, a rotary driven gear 313, a worm 314 and a worm gear 310. The auxiliary track module rotary driving device 309 is fixedly arranged in the auxiliary track frame 302. The rotary driven gear 313 and the worm 314 are coaxial and are rotatably arranged in the auxiliary track frame 302. The rotary driving gear 312 is installed on an output shaft of the auxiliary track module rotary driving device 309. The rotary driving gear 312 is engaged with the rotary driven gear 313. The worm gear 310 is fixedly arranged on the auxiliary track first wheel axle 301 and the worm gear 310 is engaged with the worm 314. When the device is operated, the rotary driving device 309 transmits the torque through the rotary driving gear 312, the rotary driven gear 313, the worm 314 and the worm gear 310 in sequence, so that the entire auxiliary track module 3 rotates around the auxiliary track first wheel axle 301. In the present embodiment, the auxiliary track module rotary driving device 309 comprises a motor and a decelerator which are connected. In addition, the middle of the auxiliary track first wheel axle 301 is provided with an auxiliary track bearing 315 supported and installed on the auxiliary track frame 302.

As shown in FIGS. 1-2, the main vehicle body 1 is provided with a sensor module 4. In the present embodiment, the sensor module 4 comprises an installing bracket 402, a visual sensor 401 and an environmental information detecting and sensing device 403. The installing bracket 402 is fixedly installed on the main vehicle body 1. The visual sensor 401 and the environmental information detecting and sensing device 403 are installed on the installing bracket 402. The visual sensor 401 and the environmental information detecting and sensing device 403 are the known technologies in the art and are commercially available products.

The present invention has the operating principle that:

When the present invention is operated, various driving mechanisms are controlled by the controller 102, wherein the main track driving mechanism drives the main track 101 to move, and when the clutch brake 1082 in the main track driving wheel 108 is braked, the clutch brake 1082 is connected with the main track driven gear 1081 and the first wheel joint 1083 rotates together with the main track driving wheel 108, so as to drive the corresponding yaw joint 2 to swing. When the clutch brake 1082 is not braked, the main track 101 and the auxiliary track 304 realize the joint walking mode, and the second wheel joint 1052 in the main track driven wheel 105 is driven to rotate by the wheel joint driving mechanism, so as to drive the corresponding yaw joint 2 to swing. The yaw joint 2 swings and drives the corresponding auxiliary track module 3 to swing; a yaw driving mechanism is arranged in the yaw joint 2 to drive the auxiliary track module 3 to rotate around the central axis of the adapter seat 207 of the axle end of the yaw joint 2. Further, in addition to the auxiliary track driving mechanism which drives the auxiliary track 304 to move, a rotary driving mechanism is also arranged in the auxiliary track module 3, to whole the entire auxiliary track module 3 to rotate around the auxiliary track first wheel axle 301. As shown in FIGS. 7-14, the present invention can realize complicated and changeable walking forms by changing the angles of different yaw joints 2 and auxiliary track modules 3, and is suitable for various complicated terrain environments such as narrow passages, wide ravines, step terrain movement, step climbing and rough road movement. For example, the auxiliary track modules 3 are inclined upwards by a certain angle, to increase the climbing capability. All the auxiliary track modules 3 are arranged laterally, to increase the capability of the present invention to pass through the narrow passages. The main track 101 advances and also rotates the first wheel joint 1083, so that the present invention crosses higher obstacles or climbs steps in a walking mode. In addition, the center position and the clearance height of the present invention can also be adjusted by controlling the angles of various joints.

The invention claimed is:

1. A reconfigurable joint track compound mobile robot, comprising a main vehicle body (1), yaw joints (2) and an auxiliary track module (3); the main vehicle body (1) is provided with a main track (101), and a clutch brake (1082) and a first wheel joint (1083) fixedly connected together are arranged in a main track driving wheel (108); a second wheel joint (1052) is arranged in a main track driven wheel (105); the main vehicle body (1) is provided with a plurality of main track driving mechanisms and a plurality of wheel joint driving mechanisms, wherein the main track driving wheel (108) is driven to rotate by the plurality of main track driving mechanisms and the plurality of main track driving mechanisms are connected with the clutch brake (1082); the second wheel joint (1052) is driven to rotate by the plurality of the wheel joint driving mechanisms; the first wheel joint (1083) and the second wheel joint (1052) are respectively connected with corresponding yaw joints (2); an adapter seat (207) is arranged at one end of the yaw joint (2) away from the main vehicle body (1); an auxiliary track (304) is arranged on the auxiliary track module (3), and an axle end (3011) of an auxiliary track first wheel axle (301) is rotatably connected with the adapter seat (207) on the corresponding yaw joint (2); a yaw driving mechanism is arranged in the yaw joint (2), and the auxiliary track module (3) is driven to swing through the yaw driving mechanism in the corresponding yaw joint (2); an auxiliary track driving mechanism and a rotary driving mechanism are arranged in the auxiliary track module (3), and the auxiliary track (304) is driven to rotate by the auxiliary track driving mechanism; and the entire auxiliary track module (3) is driven to rotate around the auxiliary track first wheel axle (301) by the rotary driving mechanism.

2. The reconfigurable joint track compound mobile robot according to claim 1, wherein a main track first wheel axle (113) and a main track second wheel axle (103) are arranged in the main vehicle body (1), and both ends of the main track first wheel axle (113) are provided with main track driving wheels (108); both ends of the main track second wheel axle (103) are provided with main track driven wheels (105); the main track driving wheel (108) and the main track driven wheel (105) are positioned on a same side and are connected through the main track (101); two main track driving mechanisms and two wheel joint driving mechanisms are arranged in the main vehicle body (1); each main track driving wheel (108) is driven to rotate by the corresponding main track driving mechanism; and the second wheel joint (1052) in each main track driven wheel (105) is driven to rotate by the corresponding wheel joint driving mechanism.

3. The reconfigurable joint track compound mobile robot according to claim 1, wherein each main track driving mechanism comprises a main track driving device (109), a main track driving gear (107) and a main track driven gear (1081); the main track driving device (109) is fixedly arranged in the main vehicle body (1); the main track driving gear (107) is installed on an output shaft of the main track driving device (109); the main track driven gear (1081) is fixedly arranged in the corresponding main track driving wheel (108) and connected with the clutch brake (1082) in the main track driving wheel (108); and the main track driving gear (107) is engaged with the main track driven gear (1081).

4. The reconfigurable joint track compound mobile robot according to claim 1, wherein each wheel joint driving mechanism comprises a wheel joint driving device (104), a wheel joint driving gear (106) and a wheel joint driven gear (1051); the wheel joint driving device (104) is fixedly arranged in the main vehicle body (1); the wheel joint driving gear (106) is installed on an output shaft of the wheel joint driving device (104); the wheel joint driven gear (1051) is rotatably arranged in the corresponding main track driven wheel (105) and fixedly connected with the second wheel joint (1052) in the main track driven wheel (105); and the wheel joint driving gear (106) is engaged with the wheel joint driven gear (1051).

5. The reconfigurable joint track compound mobile robot according to claim 1, wherein each yaw joint (2) is provided with a joint shell (202); the yaw driving mechanism is arranged in the yaw joint shell (202); the yaw driving mechanism comprises a yaw driving device (204), a yaw driving gear (206) and a yaw driven bevel gear (201); the yaw driving device (204) is fixedly arranged in the yaw joint shell (202); the yaw driving gear (206) is installed on the output shaft of the yaw driving device (204) and engaged with the yaw driven bevel gear (201); and the yaw driven bevel gear (201) is fixedly connected with the axle end (3011) of the corresponding auxiliary track first wheel axle (301).

6. The reconfigurable joint track compound mobile robot according to claim 5, wherein one end of the yaw joint shell (202) is provided with a yaw connecting piece (203), and the other end is provided with the adapter seat (207); and the yaw driving gear (206) and the yaw driven bevel gear (201) are arranged in the adapter seat (207).

7. The reconfigurable joint track compound mobile robot according to claim 1, wherein the auxiliary track module (3) comprises an auxiliary track first wheel axle (301), an auxiliary track second wheel axle (307), an auxiliary track frame (302) and an auxiliary track (304); the auxiliary track first wheel axle (301) and the auxiliary track second wheel axle (307) are respectively arranged on both ends of the auxiliary track frame (302) and the auxiliary track first wheel axle (301) is provided with an auxiliary track driven wheel (311); the auxiliary track second wheel axle (307) is provided with an auxiliary track driving wheel (308); the auxiliary track driving wheel (308) and the auxiliary track driven wheel (311) are connected through the auxiliary track (304); and the auxiliary track frame (302) is provided with the auxiliary track driving mechanism and the rotary driving mechanism.

8. The reconfigurable joint track compound mobile robot according to claim 7, wherein the auxiliary track driving mechanism comprises an auxiliary track driving device (303), an auxiliary track driving gear (305) and an auxiliary track driven gear (306); the auxiliary track driving device (303) is fixedly arranged in the auxiliary track frame (302); the auxiliary track driving gear (305) is installed on an output shaft of the auxiliary track driving device (303) and engaged with the auxiliary track driven gear (306); and the auxiliary track driven gear (306) is fixedly connected with the auxiliary track second wheel axle (307).

9. The reconfigurable joint track compound mobile robot according to claim 7, wherein the rotary driving mechanism comprises an auxiliary track module rotary driving device (309), a rotary driving gear (312), a rotary driven gear (313), a worm (314) and a worm gear (310); the auxiliary track module rotary driving device (309) is fixedly arranged in the auxiliary track frame (302); the rotary driven gear (313) and the worm (314) are coaxial and are rotatably arranged in the auxiliary track frame (302); the rotary driving gear (312) is installed on an output shaft of the auxiliary track module rotary driving device (309); the rotary driving gear (312) is engaged with the rotary driven gear (313); and the worm gear (310) is fixedly arranged on the auxiliary track first wheel axle (301) and the worm gear (310) is engaged with the worm (314).

10. The reconfigurable joint track compound mobile robot according to claim 1, wherein the main vehicle body (1) is provided with a sensor module (4).

* * * * *